(12) United States Patent
Bricker et al.

(10) Patent No.: US 8,364,917 B2
(45) Date of Patent: Jan. 29, 2013

(54) REPLICATION OF DEDUPLICATED STORAGE SYSTEM

(75) Inventors: Allan J. Bricker, Sunnyvale, CA (US); Richard Johnsson, Palo Alto, CA (US); Greg Wade, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/437,784

(22) Filed: Apr. 2, 2012

(65) Prior Publication Data

US 2012/0191931 A1 Jul. 26, 2012

Related U.S. Application Data

(63) Continuation of application No. 13/216,558, filed on Aug. 24, 2011, now Pat. No. 8,176,277, which is a continuation of application No. 12/460,766, filed on Jul. 24, 2009, now Pat. No. 8,028,138, which is a continuation of application No. 11/237,628, filed on Sep. 27, 2005, now Pat. No. 7,584,338.

(51) Int. Cl.
*G06F 12/00* (2006.01)

(52) U.S. Cl. .................. 711/158; 711/E12.103

(58) Field of Classification Search .................. 711/162, 711/E12.103
See application file for complete search history.

(56) References Cited

U.S. PATENT DOCUMENTS

| | | | | |
|---|---|---|---|---|
| 4,847,754 A * | 7/1989 | Obermarck et al. | .......... | 718/104 |
| 6,241,679 B1 * | 6/2001 | Curran | .......... | 600/485 |
| 6,308,297 B1 * | 10/2001 | Harris | .......... | 714/773 |
| 6,655,588 B2 * | 12/2003 | Fukazawa | .......... | 235/437 |
| 7,246,258 B2 * | 7/2007 | Chen et al. | .......... | 714/6.3 |
| 7,257,080 B2 * | 8/2007 | Martin | .......... | 370/230 |
| 2001/0016853 A1 * | 8/2001 | Kucala | .......... | 707/204 |
| 2002/0020744 A1 * | 2/2002 | Fukazawa | .......... | 235/437 |
| 2004/0109411 A1 * | 6/2004 | Martin | .......... | 370/229 |
| 2005/0273654 A1 * | 12/2005 | Chen et al. | .......... | 714/13 |

OTHER PUBLICATIONS

"Venti: a new approach to archival storage", S. Quinlan and S. Dorward, FAST Conf. on File and Storage Technologies, Jan. 2002, the USENIX Association.*

* cited by examiner

*Primary Examiner* — Edward Dudek, Jr.
*Assistant Examiner* — John P Fishburn
(74) *Attorney, Agent, or Firm* — Van Pelt, Yi & James LLP

(57) ABSTRACT

A method for replicating a deduplicated storage system is disclosed. A stream of data is stored on an originator deduplicating system by storing a plurality of deduplicated segments and information on how to reconstruct the stream of data. The originator deduplicating system is replicated on a replica system by sending a copy of the plurality of deduplicated segments and information on how to reconstruct the stream of data to the replica system. A first portion of the deduplicated segments stored on the originator deduplicating system that is corrupted is identified. A copy of the first portion of the deduplicated segments is requested to be sent by the replica system to the originator deduplicating system.

15 Claims, 12 Drawing Sheets

US 8,364,917 B2

REPLICATION OF DEDUPLICATED STORAGE SYSTEM

CROSS REFERENCE TO OTHER APPLICATIONS

This application is a continuation of co-pending U.S. patent application Ser. No. 13/216,558 entitled REPLICATION OF DEDUPLICATED STORAGE SYSTEM filed Aug. 24, 2011, which is a continuation of U.S. patent application Ser. No. 12/460,766 now U.S. Pat. No. 8,028,138 entitled REPLICATION OF DEDUPLICATED STORAGE SYSTEM filed Jul. 24, 2009, which is a continuation U.S. patent application Ser. No. 11/237,628, now U.S. Pat. No. 7,584,338, entitled REPLICATION OF DEDUPLICATED STORAGE SYSTEM filed Sep. 27, 2005, which are incorporated herein by reference for all purposes.

BACKGROUND OF THE INVENTION

Data Replication is important in order to be able to ensure that data survives damage to an original data storage system. A complete copy of data stored in the original data storage system at a second location requires initial and periodic transferring of data or updated data stored in the original data storage system at a first location. However, storing and transferring large amounts of data is expensive both in storage capacity and bandwidth capacity. Also, often links between the original data storage system and the replica data storage system can be unreliable in that they may not always be able carry a known bandwidth of data at any time and, in fact, may at times not be able to carry any bandwidth. It would be beneficial to be able to replicate data efficiently in terms of both storage capacity, bandwidth capacity, and without relying on an reliable link between an original data storage system and a replica data storage system.

BRIEF DESCRIPTION OF THE DRAWINGS

Various embodiments of the invention are disclosed in the following detailed description and the accompanying drawings.

DETAILED DESCRIPTION

Figure 1:
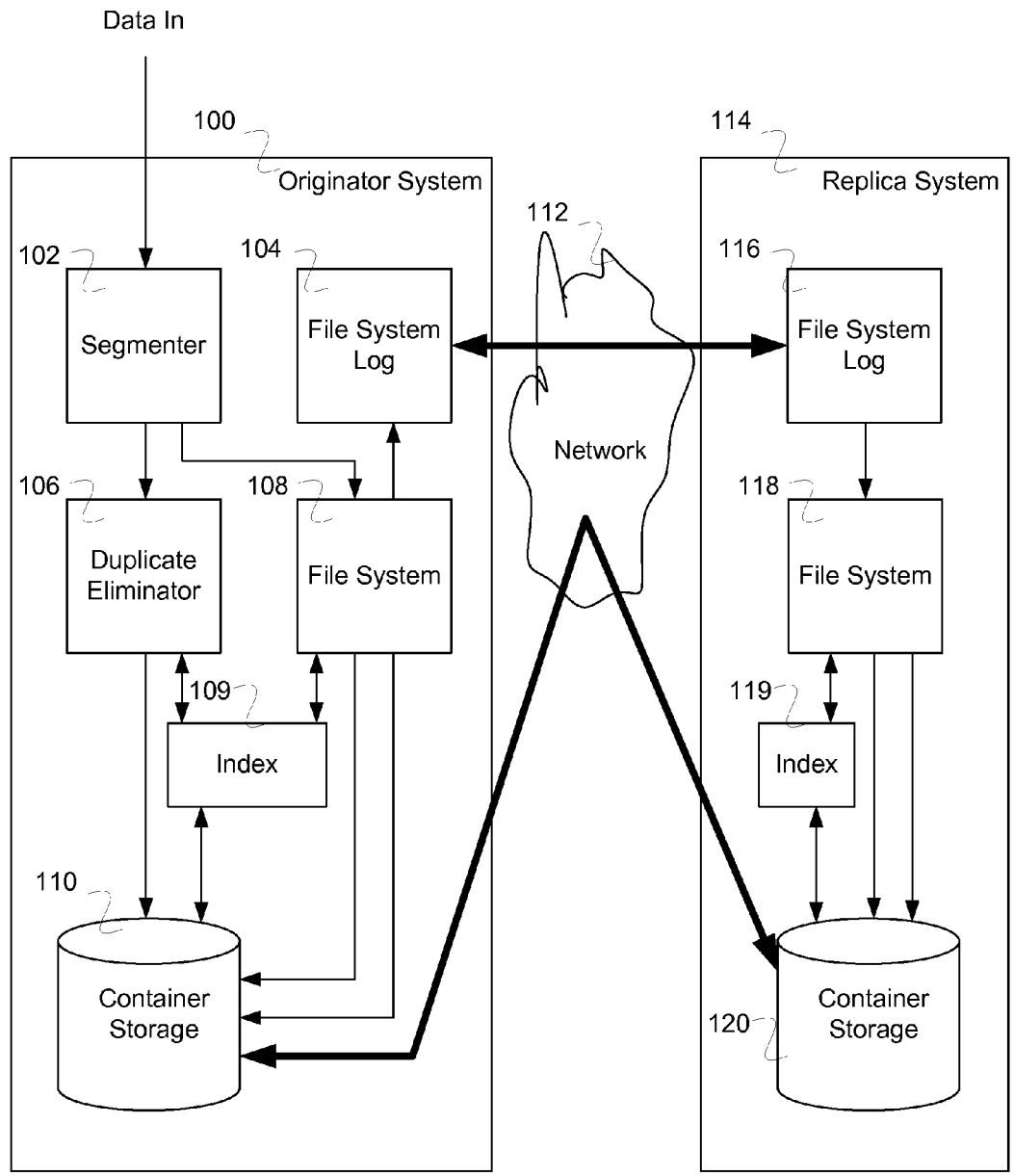
FIG. 1 is a block diagram illustrating an embodiment of replication of a deduplicating storage system.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Replication of a deduplicated storage system is disclosed. An original deduplicated storage system (an originator system) efficiently stores data by reducing duplicate segments in the stored data and keeping information to reconstruct the original stored data. Efficiencies can also be captured in replicating the deduplicated storage system (replica system) in that only the deduplicated data set and instructions to reconstruct the original data are required by the replica system. Thus, the efficiencies of the deduplication are also realized in not only the storage capacity, but also the transfer bandwidth required to maintain synchronization between the originator system and the replica system. In some embodiments, verification of the deduplicated data for the replica system is less computationally intensive compared to the originator site because a simple checksum can be relied upon. In some embodiments, updating of containers of deduplicated data is less computationally intensive compared to what the originator system is required to do because the instructions the originator system derives for updating containers (cleaning out deleted files from deduplicated data) can be transferred from the originator system instead of deriving the instructions at the replica system again.

FIG. 1 is a block diagram illustrating an embodiment of replication of a deduplicating storage system. In the example shown, originator system 100 includes segmenter 102, file system log 104, duplicate eliminator 106, file system 108, index 109, and container storage 110. Source data enters the originator system 100 and is broken into data segments by segmenter 102. Segments are passed to duplicate eliminator 106 which determines whether the data segment should be stored based at least in part on whether the data segment has been previously stored. If it is determined that a data segment should be stored, then the data segment is stored in a container in container storage 110. Segmenter 102 passes information regarding how to reconstruct the original data (for example, original files) from the data segments to file system 108. File system 108 points to data segments stored in container storage 110 and includes information on how to reconstruct original data (for example, files) from the stored data segments.

Changes to file system 108 are captured in a log in file system log 104. Changes to file system 108 include, but are not limited to, renaming of files, renaming of directories, additions of files, additions of directories, deletions of files, and deletions of directories. Index 109 is updated from container storage 110 and accessed by file system 108 and duplicate eliminator 106. In some embodiments, index 109 is modified when new containers are added, when containers are deleted, when containers are changed, or at any other appropriate time when index 109 should be modified.

Replica system 114 of FIG. 1 includes file system log 116, file system 118, index 119, and container storage 120. Replica system 114 replicates data in originator system 100 by receiving containers and file system log records that enable replica system 114 to create a copy of the information in file system 108 of originator system 100 and of the information in container storage 110 of originator system 100. Transfer of the containers and file system log records uses network 112. In various embodiments, network 112 is a local area network, a wide area network, the Internet, a wireless network, or any other appropriate network for transferring data.

In some embodiments, instructions to build containers from previously stored segments in containers are also transferred from originator system 100 to replica system 114. In some embodiments, file system log records are used to modify file system 118 only after the container corresponding to the file system log record has been received and/or verified by replica system 114. File system 118 points to data segments stored in container storage 120 and includes information on how to reconstruct original data (for example, files) from the stored data segments. Index 119 is updated from container storage 120 and accessed by file system 118. In some embodiments, index 119 is modified when new containers are added, when containers are deleted, when containers are changed, or at any other appropriate time when index 119 should be modified.

Figure 2:
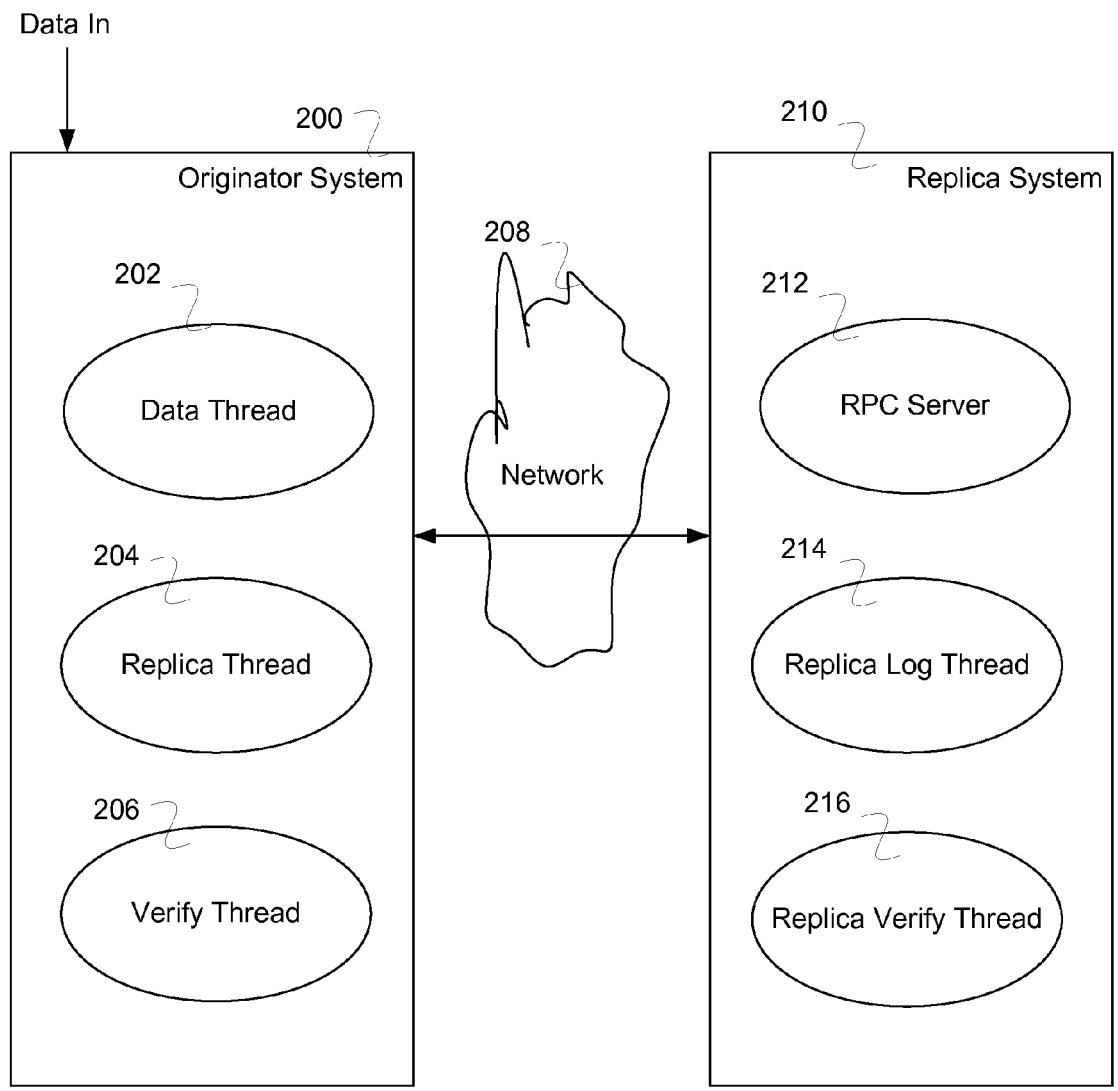
FIG. 2 illustrates an embodiment of processes for a replication deduplication storage system.

FIG. 2 illustrates an embodiment of processes for a replication deduplication storage system. In some embodiments, originator system 200 is the same as originator system 100 in FIG. 1. In some embodiments, replica system 210 is the same as replica system 114 in FIG. 1. In the example shown, originator system 200 includes processes for data thread 202, replica thread 204, and verify thread 206. Originator system 200 has as an input source data which is processed by data thread 202. Data thread 202 processes source data and stores data in a deduplicated form in a storage device. In some embodiments, the storage device is container storage device 110 in FIG. 1. Replica thread 204 manages the replication of the data stored in originator system 200 to replica system 210. Replica thread 204 handles transferring containers and file system log records as well as status information and recovery information. Replica thread communicates with replica system 210 via network 208. In various embodiments, network 208 is a local area network, a wide area network, the Internet, a wireless network, or any other appropriate data network. Verify thread 206 checks that the original data and the stored container data is equivalent. In various embodiments, checking includes checking stored checksums against calculated checksums over the stored data, decompressing data and checking stored checksums against calculated checksums, reconstructing segments to recreate original data and checking stored checksums against calculated checksums, and reconstructing segments to compare to the original data. In the event that a container does not pass the check to verify, the container will be marked as bad and the replica system will request the originator for a copy of the container.

Replica system 210 in FIG. 2 includes RPC server 212, replica log thread 214, verify thread 216. RPC (Remote Procedure Call) server 212 handles interaction with originator system 200 including, but not limited to, requests for replica state, receiving container(s), reading data from container(s), and recovering data for originator 200. Replica log thread 214 receives information—for example, a file system log record—from RPC server 212. Replica log thread 214 modifies the replica file system only after replica system 210 has received and verified the container(s) referred to in the file system log record. Replica log thread 214 also deletes containers in container delete lists as long as the corresponding file system log record has been processed. Verify thread 216 checks containers received by calculating a checksum and comparing the calculated checksum with the stored checksum in the container. In the event that a container does not pass the check to verify, the container will be marked as bad and the replica system will request the originator for a copy of the container.

Figure 3:
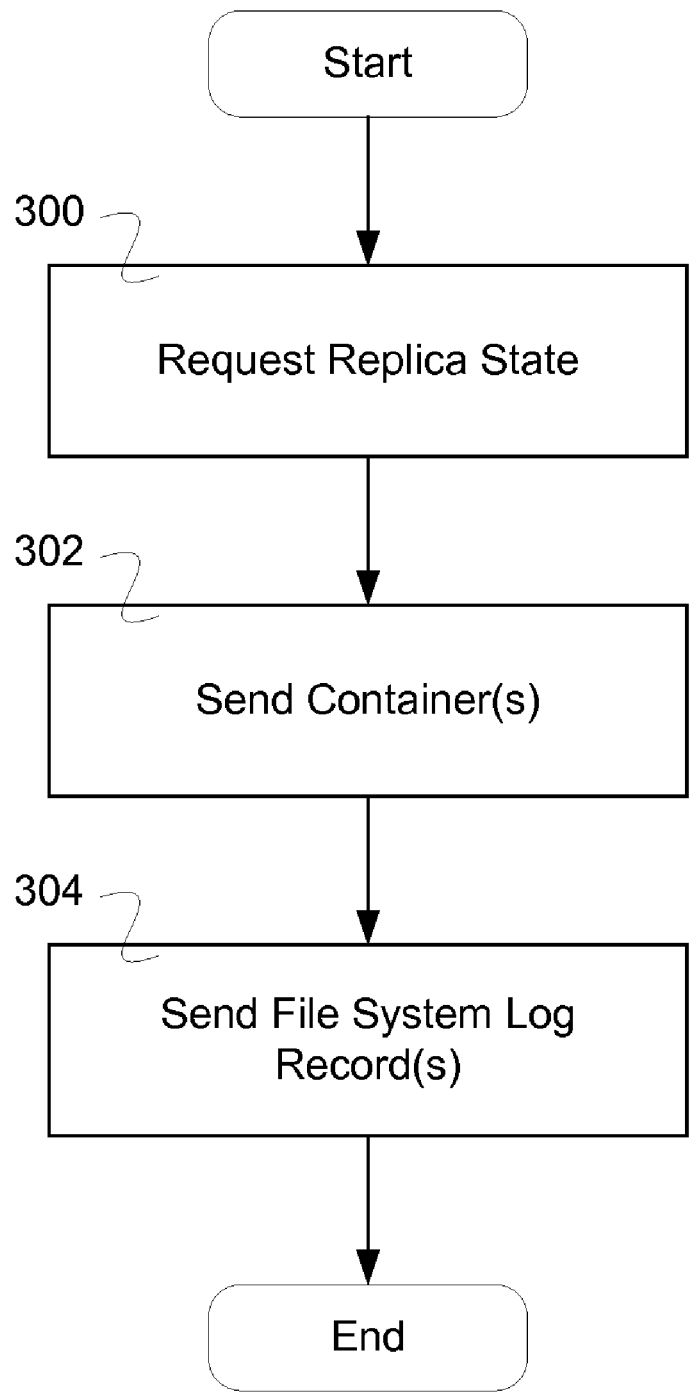
FIG. 3 illustrates a process for replicating a deduplicated storage system.

FIG. 3 illustrates a process for replicating a deduplicated storage system. In some embodiments, the process of FIG. 3 is used to implement 204 in FIG. 2. In the example shown, in 300 a request is made to get the state of the replica. The state of the replica includes, but is not limited to, the last container that has been received, the last file system log record that has been received and the information regarding how many file system log records have been processed, the container retransmit request(s), and file system log record retransmit request(s). In 302, container(s) are sent to the replica system from the originator system. In some embodiments, the replica system is replica system 114 in FIG. 1 and originator system is originator system 100 in FIG. 1. In some embodiments, originator system is originator system 200 in FIG. 2 and replica system is replica system 210 in FIG. 2. Transmitting the containers from the originator system to the replica system is efficient because the data store in the containers is already deduplicated and therefore reduces both storage requirements and bandwidth requirements of the system. In 304, file system log record(s) are sent to the replica system from the originator system. Transmitting the file system log record(s) from the originator system to the replica system is an efficient way of synchronizing the file systems of the originator and the replica systems.

Figure 4:
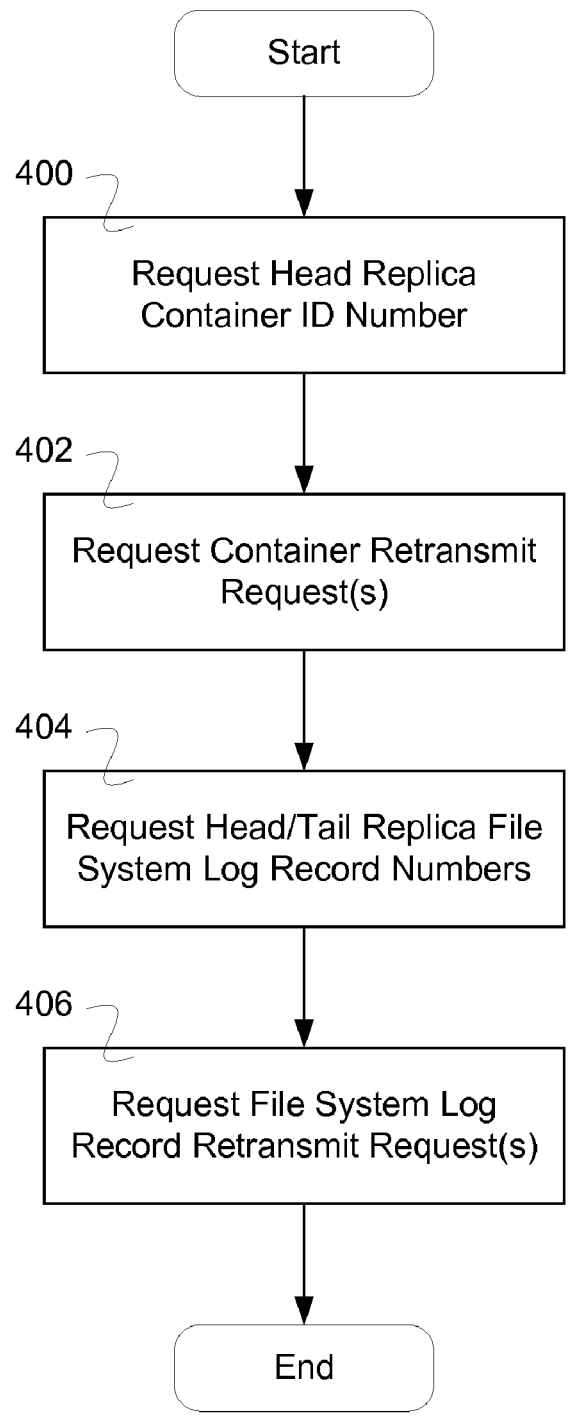
FIG. 4 illustrates an embodiment of a process for requesting the state of the replica system.

FIG. 4 illustrates an embodiment of a process for requesting the state of the replica system. In some embodiments, the process in FIG. 4 is used to implement 300 in FIG. 3. In the example shown, in 400 the head container ID number is requested from the replica system. The head (highest) container ID number received helps the originator system determine what the next container should be sent. In 402, the container(s) that need to be retransmitted are requested. Containers may be corrupted in transmission to or while being stored at the replica system; these containers can be retransmitted to correct for the corruption. In 404, head and tail file system log record numbers are requested from the replica system. The head (highest) file system log record number helps the originator system determine what the next file system log record should be sent. The tail (lowest) file system log record number helps the originator system determine how long the queue is for processing file system log records. In 406, file system log record(s) that need to be retransmitted are requested. Files or file system log records may be corrupted in transmission to or while being stored at the replica system; these files or file system log records can be retransmitted in the form of a file system log record to correct for the corruption.

Figure 5:
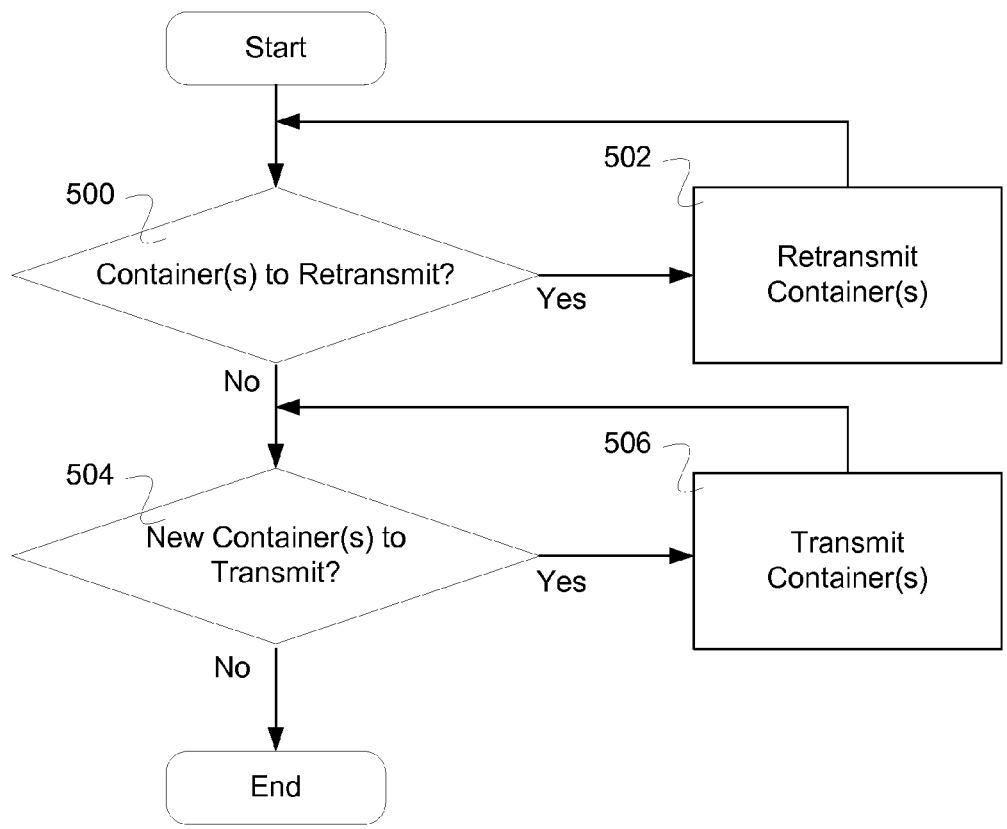
FIG. 5 illustrates an embodiment of a process for sending container(s).

FIG. 5 illustrates an embodiment of a process for sending container(s). In some embodiments, the process in FIG. 5 is used to implement 302 in FIG. 3. In the example shown, in 500 it is determined if there are one or more containers to retransmit. If there are container(s) to retransmit, then in 502 one or more containers are retransmitted and control is returned to 500. In various embodiments, all containers are transmitted sequentially, some number of containers up to a maximum number of containers are transmitted, a variable number of containers are transmitted where the number is based upon available transmission bandwidth, processing bandwidth of the replica system, processing bandwidth of the originator system, or another number of containers based on an appropriate limitation in the system. If there are no containers to retransmit, then in 504 it is determined if there are new container(s) to transmit. If there are new container(s) to transmit, then in 506 one or more containers are transmitted to the replica system again appropriate to the limitations of the system and control is returned to 504. If there are no containers to transmit, then the process ends.

Figure 6:
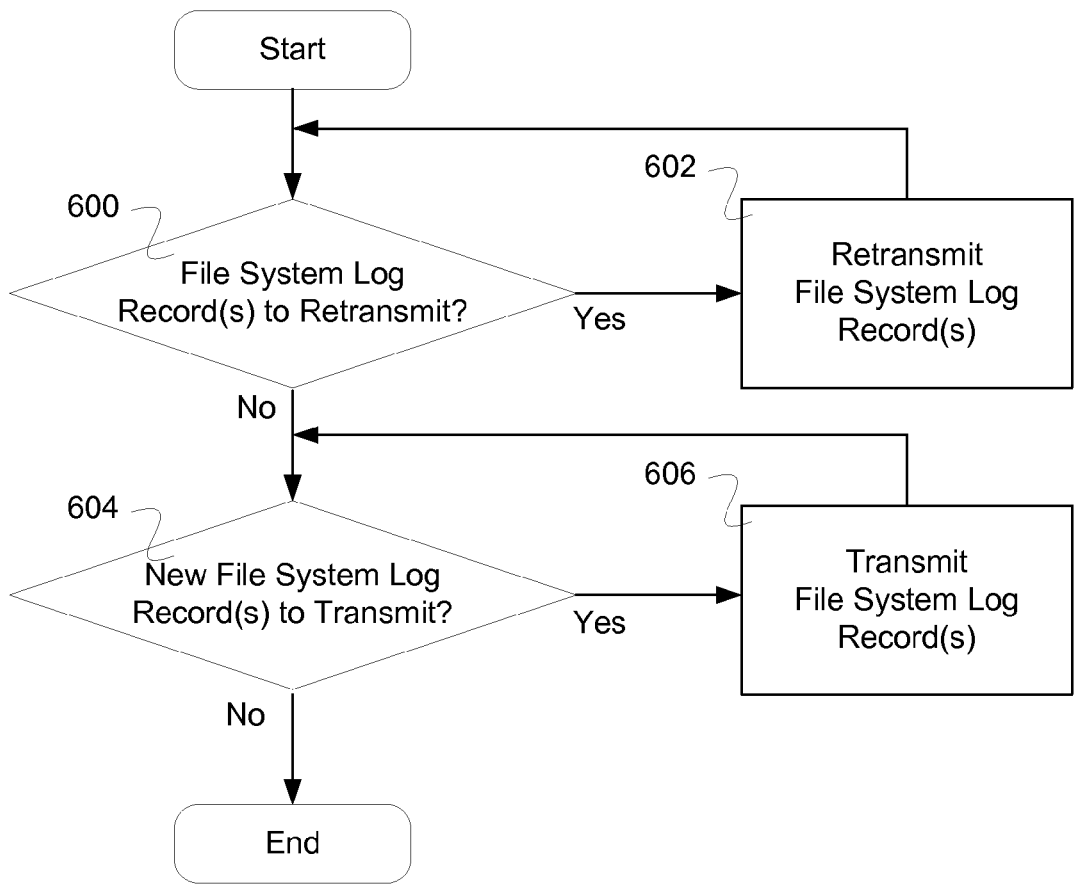
FIG. 6 illustrates an embodiment of a process for sending file system log record(s).

FIG. 6 illustrates an embodiment of a process for sending file system log record(s). In some embodiments, the process in FIG. 6 is used to implement 304 in FIG. 3. In the example shown, in 600 it is determined if there are one or more file system log records to retransmit. If there are file system log record(s) to retransmit, then in 602 one or more file system log records are retransmitted and control is returned to 600. In various embodiments, all file system log records are transmitted sequentially, some number of file system log records up to a maximum number of file system log records are transmitted, a variable number of file system log records are transmitted where the number is based upon available transmission bandwidth, processing bandwidth of the replica system, processing bandwidth of the originator system, or another number of file system log records based on an appropriate limitation in the system. If there are no file system log records to retransmit, then in 604 it is determined if there are new file system log record(s) to transmit. If there are new file system log record(s) to transmit, then in 606 one or more file system log records are transmitted to the replica system again appropriate to the limitations of the system and control is returned to 604. If there are no file system log records to transmit, then the process ends.

Figure 7:
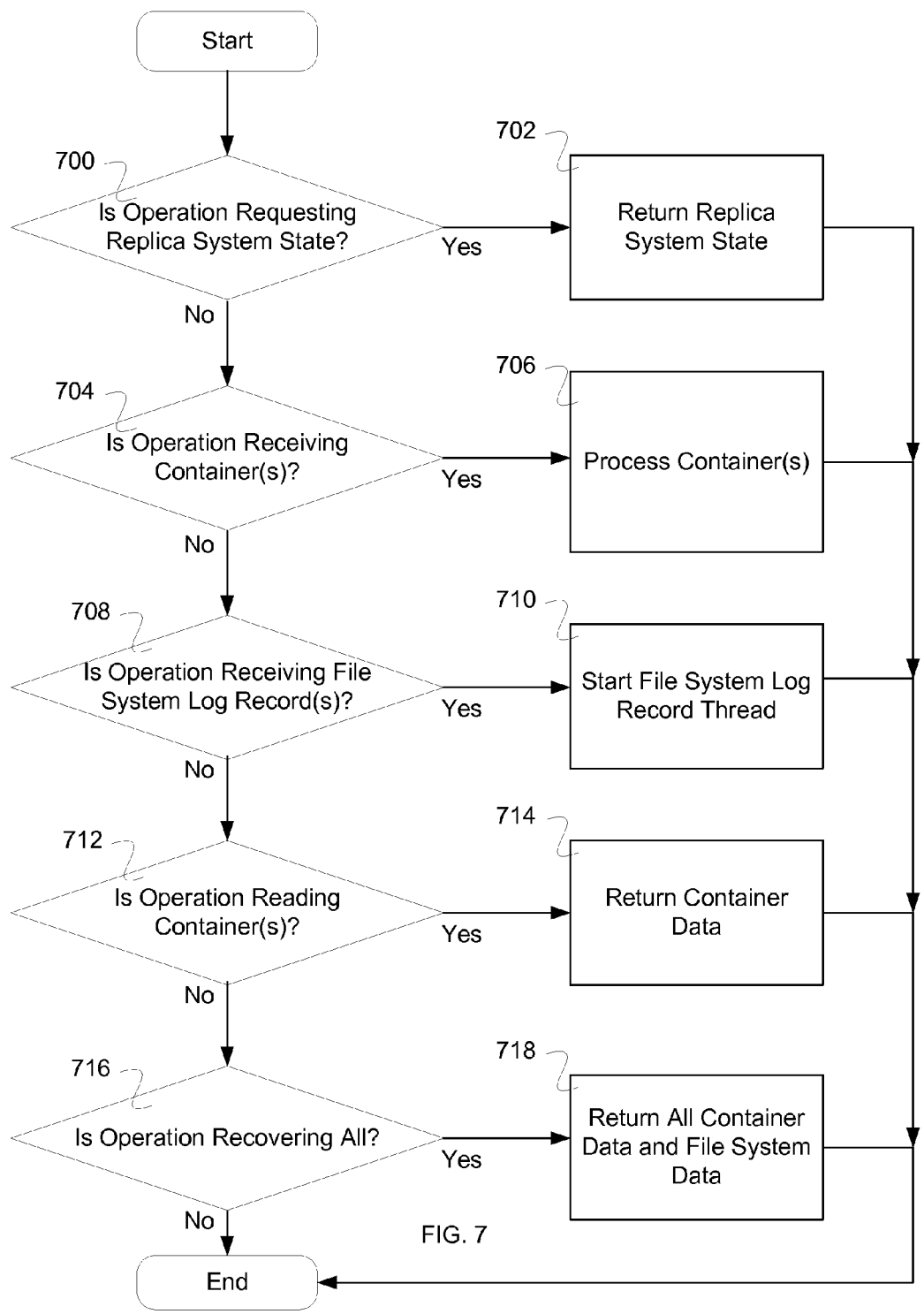
FIG. 7 illustrates an embodiment of a process for a RPC (Remote Procedure Call) server.

FIG. 7 illustrates an embodiment of a process for a RPC (Remote Procedure Call) server. In some embodiments, the process of FIG. 7 is used to implement 212 in FIG. 2. In the example shown, in 700 it is determined if the operation requested is a request for the state of the replica system. If it is a request for the state of the replica, then in 702 the state of the replica system is obtained and returned to the originator system and the process ends. The state of the replica system includes, but is not limited to, the head container ID number, a list of the requested container ID'(s) for retransmission, the head and tail file system log record numbers, and a list of the requested file(s) or file system log record(s) for retransmission.

In 704, it is determined if the operation requested is receiving container(s). If it is receiving containers, then in 706 the containers are processed and the process ends. Processing includes, but is not limited to, entering a new container into the container storage such as container storage 120 in FIG. 1, and executing instructions for building new container(s) based on data already in the container storage of the replica system. In some embodiments, a garbage collection process on the originator system periodically combs old containers and removes segments that are no longer referred to in the file system. After these segments are removed, containers can be consolidated to create new containers. These instructions for consolidation of containers can be included in a file system log record so that the replica system can similarly consolidate containers without searching the file system to locate segments that are no longer referred to in the file system.

In 708, it is determined if the operation requested is receiving file system log record(s). If it is receiving file system log records, then in 710 the file system log record thread is started and the process ends. The file system log record thread modifies the file system according to the file system log record. Also, a file system log record is not processed until the corresponding container has been added to the container storage and/or verified as being correct. The file system log record thread also processes delete lists in containers that have already had their corresponding file system log record processed.

In 712, it is determined if the operation requested is reading a container. If it is reading container(s), then in 714 a container is read to obtain the requested data, the data is returned to the originator system, and the process ends. In some embodiments, data is reconstructed from the container using information in the file system. In some embodiments, reconstruction includes decompression as well as reconstructing one or more segments to make a data file.

In 716, it is determined if the operation requested is recovering all data. If it is recovering all data, then in 718 all containers and file system information are transmitted to the originator system in appropriate amounts at a time in order to be mindful of the system limitations in processing or transmission bandwidth, and the process ends. In some embodiments, the file system information is processed to create file system log records that are transmitted to the originator system.

Figure 8:
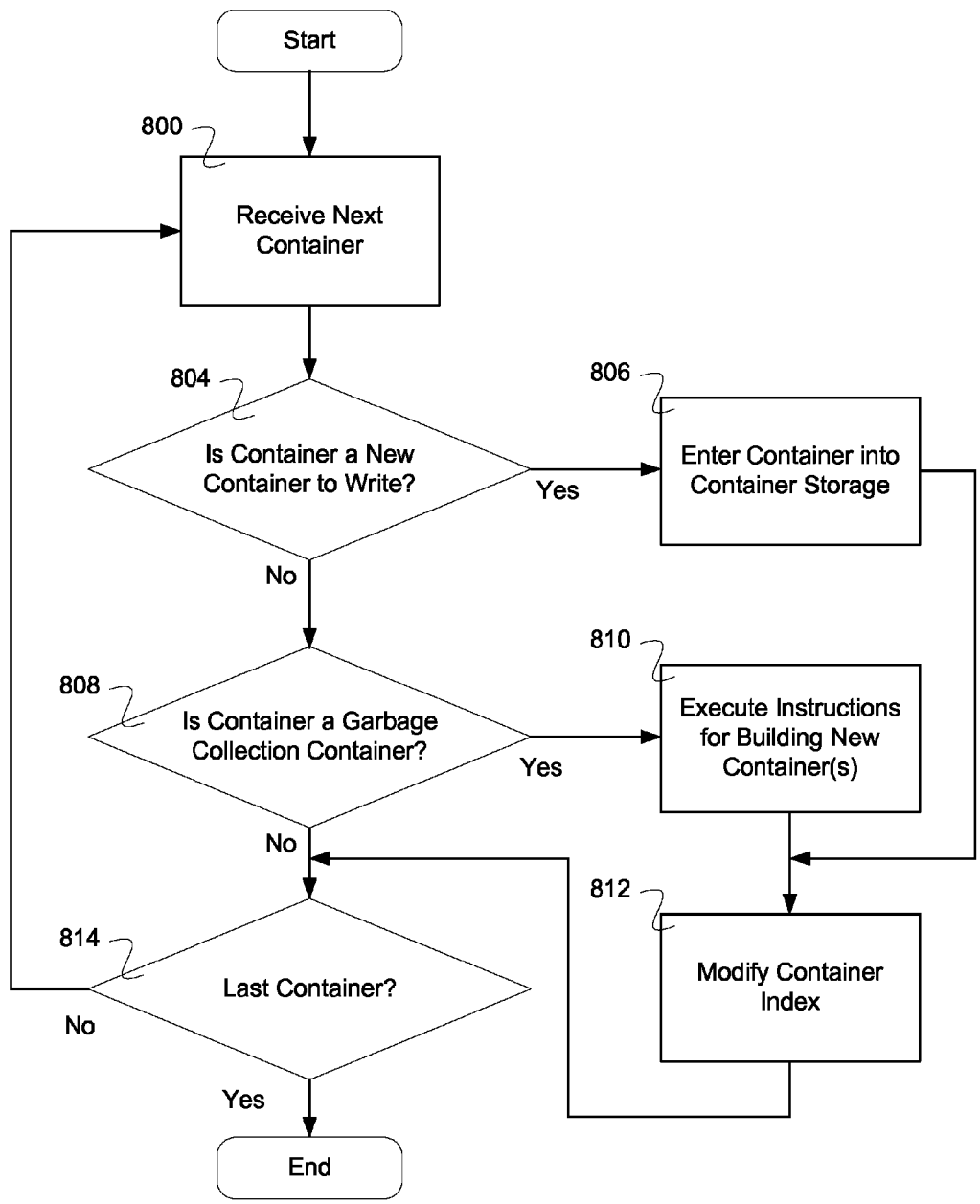
FIG. 8 illustrates an embodiment of a process for processing containers.

FIG. 8 illustrates an embodiment of a process for processing containers. In some embodiments, the process in FIG. 8 is used to implement 706 in FIG. 7. In the example shown, in 800 the next container is received from the originator system at the replica system in order to replicate the data stored on the originator system. In some embodiments, the container is received and processed by RPC server 212 as in FIG. 2. In 804, it is determined if the container is a new container to be written (stored) on the replica system. If it is a new container, then in 806 the container is stored in the container storage and control is passed to 812. If it is not a new container, then in 808 it is determined if the container is a garbage collection container. A garbage collection container comprises instructions on how to create a new container from existing data in containers. The garbage collection process on the originator system clean up old containers and consolidates the remaining data into a new container using instructions. A copy of these instructions is sent to the replica system in order to easily mirror the garbage collection process on the replica system. If it is a garbage collection container, then in 810 the instructions included in the garbage collection container are executed in order to create one or more containers from existing data on the replica system (for example, data already stored in existing stored containers on the replica system in container storage), and control is passed to 812.

In 812, the index to the container storage is modified to account for the changes of either adding a new container or creating one or more new containers from a garbage collection container, and control is passed to 814. In 814, it is determined if it is the last container to be processed. If it is not the last container, then control is passed to 800. If it is the last container, then the process ends.

Figure 9:
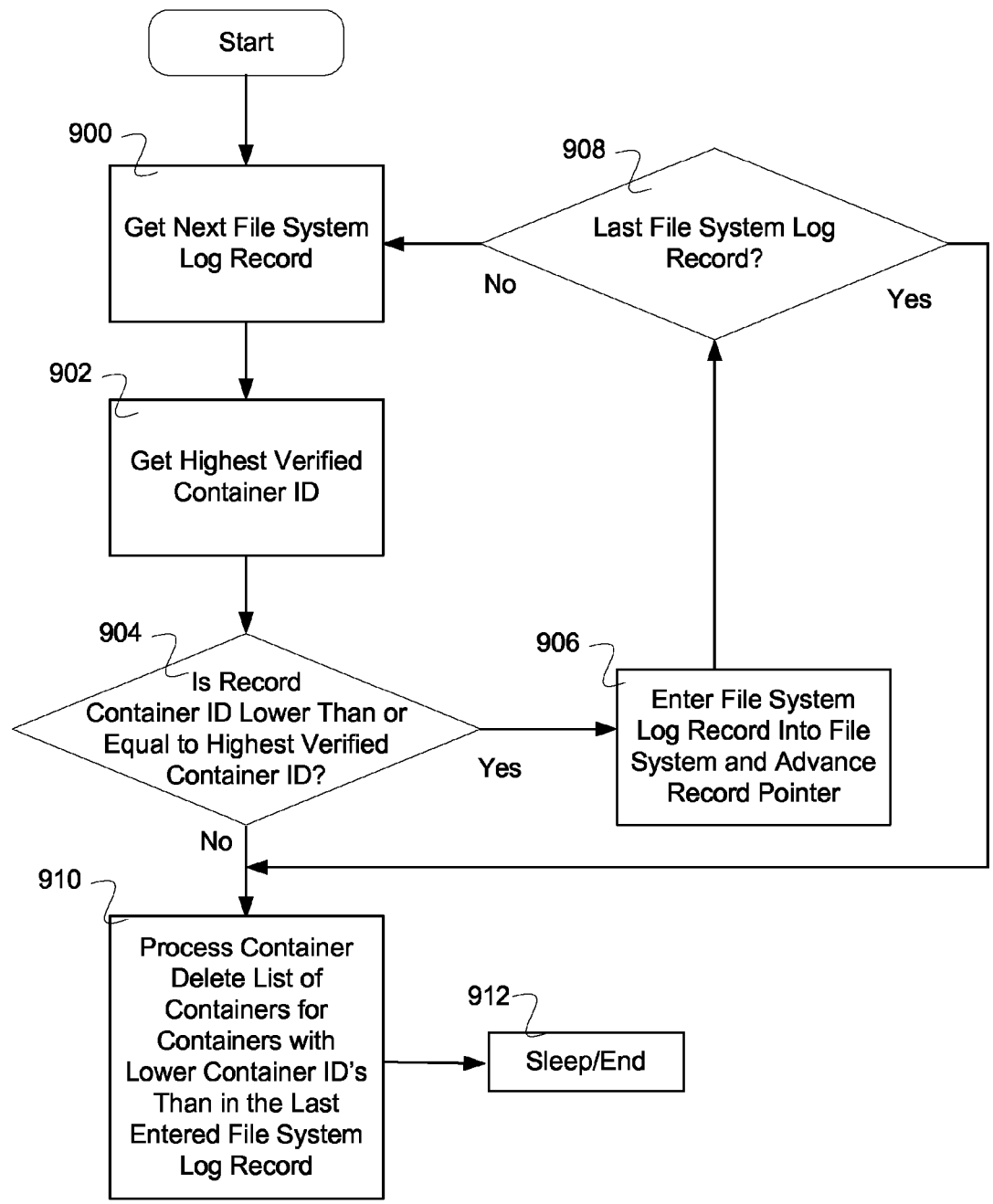
FIG. 9 illustrates an embodiment of a process for processing file system log records.

FIG. 9 illustrates an embodiment of a process for processing file system log records. In some embodiments, the process of FIG. 9 is used to implement the file system log record thread of 710 in FIG. 7 and/or 214 of FIG. 2. In the example shown, in 900 the next file system log record is received from the originator system at the replica system in order to replicate the file system of the originator system. In 902, the highest verified container ID is obtained. In some embodiments, the highest verified container ID is obtained from a process such as verify replica thread process 214 in FIG. 2 that checks containers to see if the data is still valid. In some embodiments, the data is verified by checking a calculated checksum against a stored checksum. In 904, it is determined if the container ID corresponding to the file system log record is lower than or equal to the highest verified container ID. If the container ID corresponds to already verified container ID, then in 906 the file system log record is processed so that it is entered into the file system of the replica system, the record log pointer is incremented, and control passes to 908. In 908, it is determined if it is the last record. If it is not the last record, then control passes to 900. If it is the last record, control is passed to 910.

In 904, if it determined that the container ID corresponding to the file system log record is higher than the highest verified container ID, then control is passed to 910. In 910, container delete lists are processed for containers with container ID's that are lower than or equal to the container ID corresponding to the last entered file system log record. Container delete lists are those containers that are indicated to be deleted within a container. In some embodiments, the container delete list is generated by the garbage collection process on the originator system; one or more containers are created using data in previously stored containers and once these new one or more containers are created then the previously stored containers can be deleted. In 912, the process ends or sleeps. The process can be restarted when a new file system log record is received from the originator system or when another container has been verified.

Figure 10:
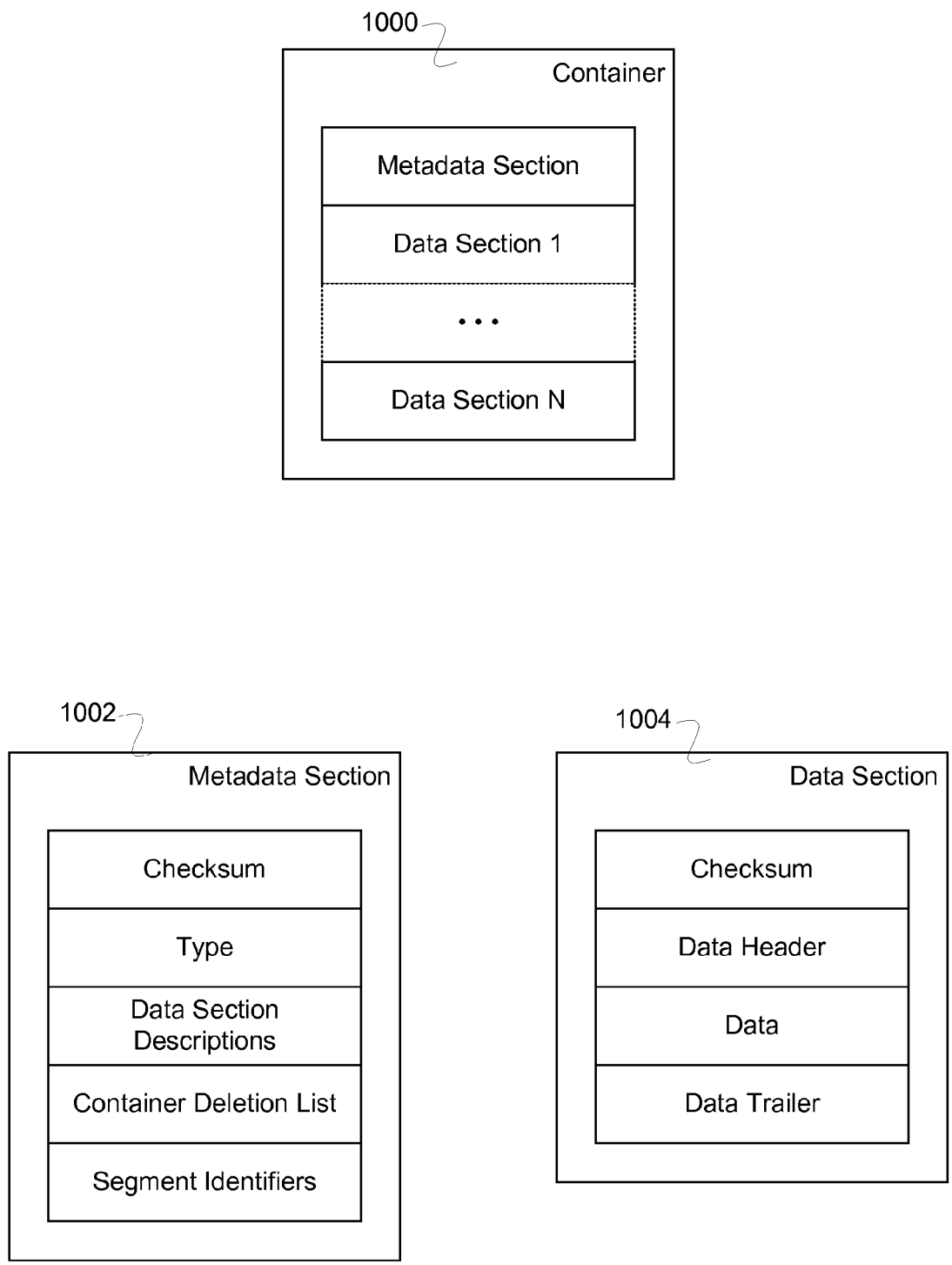
FIG. 10 illustrates an embodiment of a container.

FIG. 10 illustrates an embodiment of a container. In the example shown, container 1000 includes a metadata section and a plurality of data sections which are represented in FIG. 10 by data section 1 and data section N. Metadata section contains information regarding the container and its contents. Data sections contain the actual data of the container.

Metadata section 1002 includes subsections checksum, type, data section descriptions, container deletion list, and segment identifiers. Checksum includes a checksum for the metadata section that allows validating of the section's data. In some embodiments, the checksum subsection also includes other information to help in identifying and checking data in the section including a container identifier, a container length, and an offset value. Type includes the type of the container—for example, a new container or a garbage collection container. A new container contains data to be stored in container storage. A garbage collection container contains instructions to create new containers using data previously stored in other containers. Data section description includes information describing the data sections including formatting, encryption, compression, sizes, lengths, identifiers, subsections, etc. Container deletion list includes a list of containers that can be deleted once the container that the container deletion list is in has been verified and the file system record log has been corresponding to the container has been entered into the file system. Segment identifiers include a list or index of the segments in the data sections of the container as well as the size of the segments in the data sections of the container.

Data section 1004 includes subsections checksum, data header, data, and data trailer. Checksum includes a checksum for the data section that allows validating of the section's data. Data header includes information regarding the type of data, information for compression/decompression of the data, and/or information for encryption/decryption of the data, and number of segments. Data contains the segments in a compressed and/or encrypted format. Data trailer includes information regarding the sizes of the segments after decompression that can be used to regenerate the segment identifier subsection of the metadata section.

Figure 11:
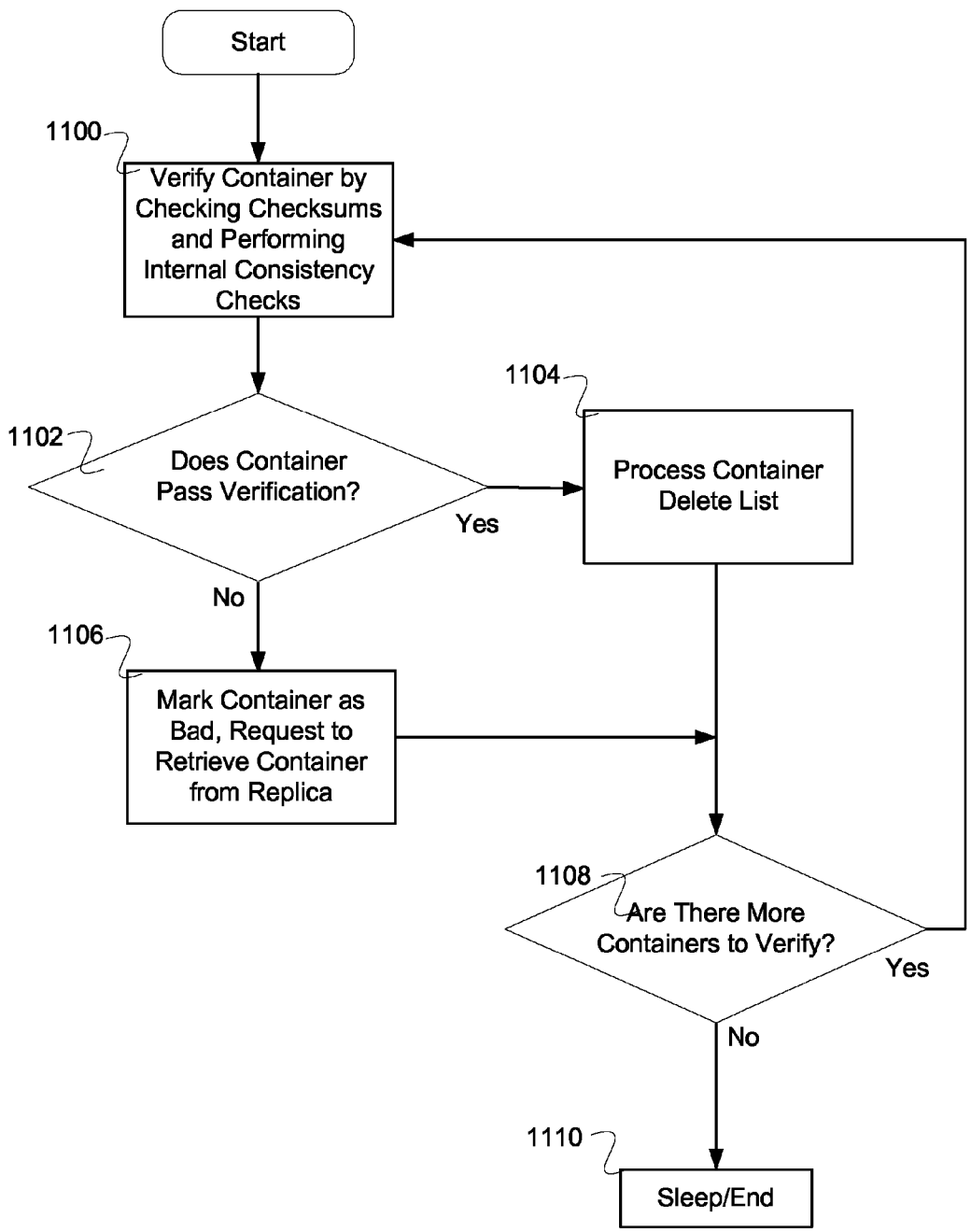
FIG. 11 illustrates a process for verification of containers for the originator system.

FIG. 11 illustrates a process for verification of containers for the originator system. In some embodiments, the process of FIG. 11 is used to implement 206 of FIG. 2. In the example shown, in 1100 the container is verified using checksum calculation and checking against a precaculated stored checksum and internal consistency checks—for example, decompressing (and perhaps decrypting) the data segment to check the data segment using another checksum or direct comparison. In 1102, it is determined if the container passes the verification. If the container does pass verification, then in 1004 the container delete list is processed and control passes to 1108. If the container does not pass verification, then in 1106 the container is marked as bad and a request is made to retrieve the bad container from the replica system, and control passes to 1108. In 1108, it is determined if there are any other containers to verify. If there are more containers to verify, then control passes to 1100. If there are no more containers to verify, then control passes to 1110 and the process sleeps or ends. The process can restart if there are new containers generated by the data thread process (for example, such as 202 in FIG. 2), the garbage collection process, or are received from the replica system.

Figure 12:
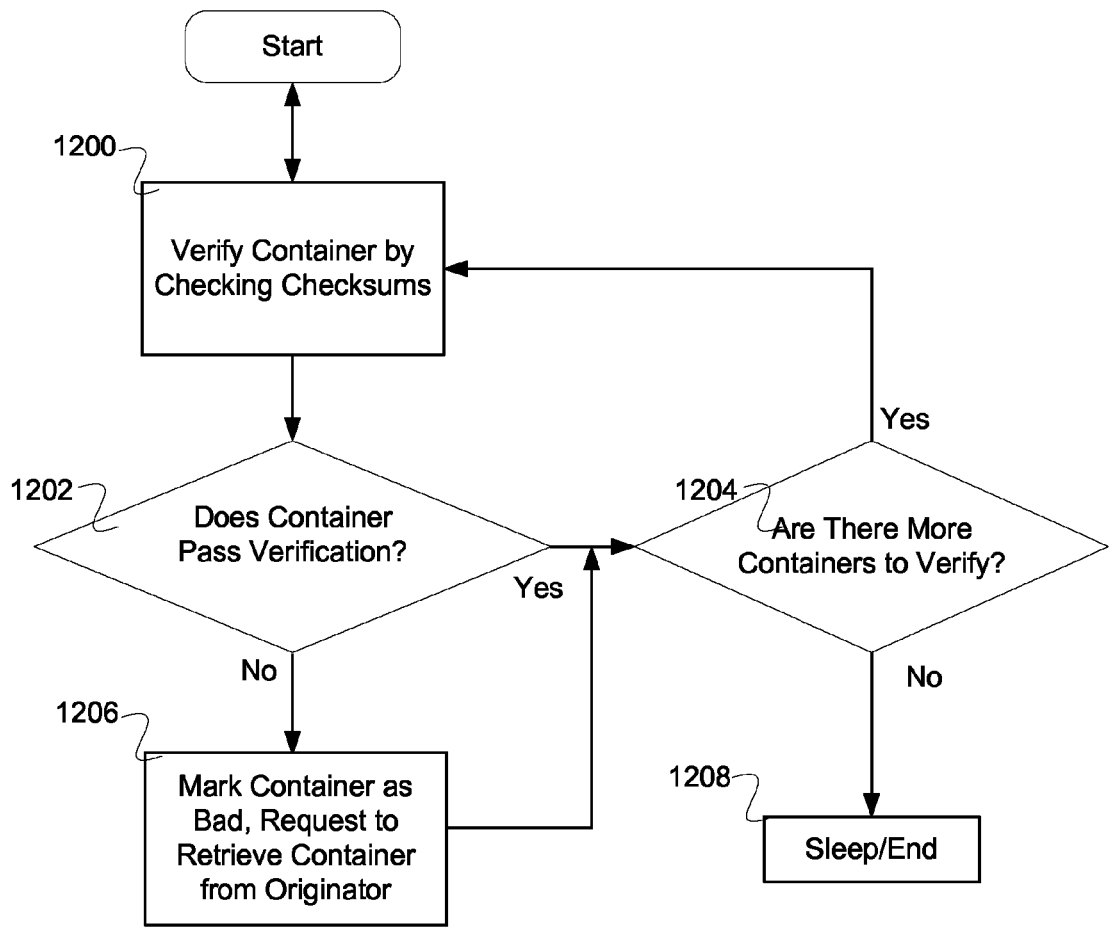
FIG. 12 illustrates an embodiment of a process for verification of containers for a replica system.

FIG. 12 illustrates an embodiment of a process for verification of containers for a replica system. In some embodiments, the process of FIG. 12 is used to implement 216 of FIG. 2. In the example shown, in 1200 containers are verified by checking checksums. The checksum for the container is calculated and compared against a precaculated stored checksum value. In 1202, it is determined if the container passes verification. If the container passes verification, then in 1204 it is determined if there are more containers to be verified. If there are more containers to be verified, then control passes to 1200. If there are not more containers to be verified, then control passes to 1208 where the process sleeps or ends. The process can restart if there is a new container received from the originator system or there is a new container created from previously stored containers. If the container does not pass verification, then in 1206 the container is marked as bad and a request is made to retrieve the container from the originator system, and control is passed to 1204.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for replicating an originator deduplicating storage system, comprising:

storing a stream of data on an originator deduplicating storage system by storing a plurality of deduplicated segments and information on how to reconstruct the stream of data;

replicating the originator deduplicating storage system on a replica system by sending a copy of the plurality of deduplicated segments and information on how to reconstruct the stream of data to the replica system; and identifying a first portion of the deduplicated segments stored on the originator deduplicating storage system that is corrupted and requesting a copy of the first portion of the deduplicated segments to be sent by the replica system to the originator deduplicating storage system, wherein identifying comprises performing internal consistency checks.

2. The method of claim 1, wherein the first portion of the deduplicated segments that is corrupted comprises deduplicated segments that fail to represent a corresponding portion of the stream of data.

3. The method of claim 1, wherein the first portion of the deduplicated segments that is corrupted corresponds to a container, and wherein the container comprises a metadata section and one or more data sections.

4. The method of claim 1, wherein identifying comprises checking a calculated checksum against a stored checksum.

5. The method of claim 1, further comprising:

receiving a request for a copy of a second portion of the deduplicated segments from the replica system, wherein the second portion of the deduplicated segments is identified by the replica system as being corrupted on the replica system; and sending the copy of the second portion of the deduplicated segments to the replica system.

6. An originator deduplicating storage system, comprising:

a processor configured to:

store a stream of data on the originator deduplicating storage system by storing a plurality of deduplicated segments and information on how to reconstruct the stream of data;

send a copy of the plurality of deduplicated segments and information on how to reconstruct the stream of data to a replica system replicating the originator deduplicating storage system; and identify a first portion of the deduplicated segments stored on the originator deduplicating storage system that is corrupted and request a copy of the first portion of the deduplicated segments to be sent by the replica system to the originator deduplicating storage system; and a memory coupled to the processor and configured to provide the processor with instructions, wherein identifying comprises performing internal consistency checks.

7. The system of claim 6, wherein the first portion of the deduplicated segments that is corrupted comprises deduplicated segments that fail to represent a corresponding portion of the stream of data.

8. The system of claim 6, wherein the first portion of the deduplicated segments that is corrupted corresponds to a container, and wherein the container comprises a metadata section and one or more data sections.

9. The system of claim 6, wherein identifying comprises checking a calculated checksum against a stored checksum.

10. The system of claim 6, wherein the processor is further configured to:

receive a request for a copy of a second portion of the deduplicated segments from the replica system, wherein the second portion of the deduplicated segments is identified by the replica system as being corrupted on the replica system; and send the copy of the second portion of the deduplicated segments to the replica system.

11. A computer program product for replicating a deduplicating storage system, the computer program product being embodied in a non-transitory computer readable medium and comprising computer instructions for:

storing a stream of data on an originator deduplicating storage system by storing a plurality of deduplicated segments and information on how to reconstruct the stream of data;

replicating the originator deduplicating storage system on a replica system by sending a copy of the plurality of deduplicated segments and information on how to reconstruct the stream of data to the replica system; and identifying a first portion of the deduplicated segments stored on the originator deduplicating storage system that is corrupted and requesting a copy of the first portion of the deduplicated segments to be sent by the replica system to the originator deduplicating storage system, wherein identifying comprises performing internal consistency checks.

12. The computer program product of claim 11, wherein the first portion of the deduplicated segments that is corrupted comprises deduplicated segments that fail to represent a corresponding portion of the stream of data.

13. The computer program product of claim 11, wherein the first portion of the deduplicated segments that is corrupted corresponds to a container, and wherein the container comprises a metadata section and one or more data sections.

14. The computer program product of claim 11, wherein identifying comprises checking a calculated checksum against a stored checksum.

15. The computer program product of claim 11, further comprising computer instructions for:

receiving a request for a copy of a second portion of the deduplicated segments from the replica system, wherein the second portion of the deduplicated segments is identified by the replica system as being corrupted on the replica system; and sending the copy of the second portion of the deduplicated segments to the replica system.

* * * * *